United States Patent

Lowe

[11] Patent Number: 6,009,473
[45] Date of Patent: Dec. 28, 1999

[54] USING CALLBACKS TO EFFECTIVELY MANAGE RESOURCES

[75] Inventor: David Lowe, Foster City, Calif.

[73] Assignee: Oracle Corporation, Redwood Shores, Calif.

[21] Appl. No.: 08/846,715

[22] Filed: Apr. 30, 1997

[51] Int. Cl.[6] .................................................. H04L 12/20
[52] U.S. Cl. .......................................... 709/233; 370/231
[58] Field of Search .................................. 370/231, 232, 370/234, 235; 709/232, 233, 235

[56] References Cited

U.S. PATENT DOCUMENTS

| | | | |
|---|---|---|---|
| 5,115,429 | 5/1992 | Hluchyj et al. | 370/231 |
| 5,280,470 | 1/1994 | Buhrke et al. | 370/232 |
| 5,367,523 | 11/1994 | Chang et al. | 370/235 |
| 5,400,329 | 3/1995 | Tokura et al. | 370/232 |
| 5,598,416 | 1/1997 | Yamada et al. | 370/335 X |
| 5,675,576 | 10/1997 | Kalampoukas et al. | 370/232 |
| 5,701,292 | 12/1997 | Chiussi et al. | 370/232 |
| 5,799,002 | 8/1998 | Krishnan | 370/234 |

FOREIGN PATENT DOCUMENTS

| | | |
|---|---|---|
| 94/14256 A1 | 6/1994 | WIPO . |
| 95/11557 A1 | 4/1995 | WIPO . |

OTHER PUBLICATIONS

Chinatsu Ikeda et al., Adaptive Congestion Control Schemes for ATMLANs, IEEE Electronic Library, 1994, pp. 829–838.

Primary Examiner—Zarni Maung
Assistant Examiner—Patrice Winder
Attorney, Agent, or Firm—McDermott, Will & Emery

[57] ABSTRACT

A method for sharing a resource among a plurality of clients is provided. A request is received by a client requesting access to a shared resource. A usage rate is determined for the client. The usage rate of clients are reduced by transmitting a request for a usage reduction to the clients. The request for the usage reduction is initiated independent of a receipt of a message from the clients whose usage rates are being reduced. If a requested usage reduction would reduce a client below a minimum usage rate, then the usage rate of the client is set to the minimum usage rate. The minimum usage rate can be established by the client or by configuration data. The usage rate of a non-real-time client is adjusted based on a uniform rate. If the uniform rate is higher than a maximum usage rate, then the usage rate of a non-real-time client is adjusted to the maximum usage rate. The maximum usage rate can be established by the client or by configuration data.

44 Claims, 3 Drawing Sheets

USING CALLBACKS TO EFFECTIVELY MANAGE RESOURCES

RELATED APPLICATION

The present application is related to: U.S. patent application Ser. No. 08/646,685, entitled "DYNAMIC INPUT/OUTPUT BANDWIDTH ALLOCATION IN A REAL TIME PROCESSING SYSTEM", filed by Sue Lee and William Bailey on May 6, 1996, the contents of which are incorporated herein by reference.

FIELD OF THE INVENTION

The present invention relates to managing shared resources in a computer system, and more particularly, to allocating usage of a shared resource among the clients that use the resource.

BACKGROUND OF THE INVENTION

A client is any entity which receives data supplied by a server. Clients of a data server may include, for example, a process on the same node as the data server, a process on a different node than the data server, or a thread within a process. In a multi-process client/server computer system, a data server usually supplies data to multiple clients. The maximum rate at which a data server can supply data is known as the bandwidth of the server. The bandwidth of a server must be shared among the clients of the data server.

Clients of data servers can be classified as either real-time clients or non-real-time clients. In order to function properly, real-time clients require data at set times and at a relatively constant rate. Data that arrives late typically is useless to real time clients and can cause them to function improperly. For example, data for movie frames from a video server that arrives too late to be shown cannot be used and causes a visible momentary interruption of the movie. Timing is not so critical to non-real time clients. In order to function properly, non-real time clients do not require data at set times and may use data at varying rates.

Typically, the bandwidth of a data server is allocated in a manner that ensures that the constraints of real-time clients are met. Each real-time client is allocated a portion of the bandwidth to ensure that data is received at the constant rate required for the real-time client to function properly. The portion of bandwidth remaining after allocation to the real-time clients is shared among the non-real-time clients. The allocation to a non-real-time client is not constant because, unlike a real-time client, a non-real-time client can function properly while receiving data at varying rates.

To adapt to changes in the use of data from data servers by the clients of the data server, the allocations of bandwidth to the non-real-time clients is adjusted dynamically. One approach to changing allocations of bandwidth to clients is the client polling approach. In the client polling approach, at set time intervals a non-real-time client transmits messages to the data server seeking an adjustment to the amount of bandwidth allocated to the non-real-time client.

Transmitting messages between a client and server can require a lot of overhead, especially when a client resides on one node and the server resides on another node. One measure used to reduce the overhead incurred in transmitting messages is to increase the time between the time intervals at which a non-real-time client polls the server. Another measure is to limit the particular non-real-time clients that may poll a server to a subset of non-real-time-clients.

The client polling approach presents a few disadvantages. One disadvantage is that adjustments to bandwidth allocations are triggered by the passage of time, rather than by the events that create the need to re-adjust the bandwidth allocation. As a consequence, clients often poll servers, incurring the overhead of transmitting a message, when no adjustment of the allocation of the bandwidth is needed. Furthermore, when the need to adjust the allocation of bandwidth to a non-real-time client arises, the allocation can not be adjusted until the non-real-time client polls the server.

The delay caused by waiting for a non-real-time client to poll a server before adjusting the bandwidth allocation to that non-real-time client is especially disadvantageous when a new client requests access to a data server whose bandwidth has been fully allocated. To make bandwidth available to the new client, the bandwidth allocations to current non-real-time clients must be reduced. Consequently, the allocation to the new client is postponed until the necessary non-real-time clients poll the data server and have their allocated bandwidth reduced. This postponement can cause an unacceptably long delay in responding to the requests of new clients.

To avoid incurring this long delay, allocation of the full bandwidth of data server is avoided. The unallocated portion of the bandwidth serves as a reserve that is immediately available to new clients. When a portion of the bandwidth is allocated to a new client, the reserve is diminished. To replenish the reserve, the current allocation to each non-real-time client may be reduced if and when that non-real-time client next polls the server. If a client requests access when there is no reserve available, the request is denied. The risk of denial can be decreased by increasing the reserve.

Unfortunately, use of the reserve entails a tradeoff between reducing the risk of denying a new request by a new client for access to a data server and the throughput of the server, especially the throughput to non-real-time clients. To reduce the risk of denying a request for access by new clients, the portion of the bandwidth held in reserve may be increased. However, this increase in the reserve reduces bandwidth allocated to the non-real-time clients, thus decreasing throughput to them.

Based on the foregoing, it is clearly desirable to allocate a larger portion of the bandwidth to non-real-time clients without increasing the risk of denial of a request by a new client, and without increasing latency to an unacceptable level in responding to new requests. It is further desirable to avoid the overhead caused by a non-real-client periodically polling a data server for adjustments to the allocation of bandwidth to the non-real-time client.

SUMMARY OF THE INVENTION

A method for sharing a resource among a plurality of clients is described. According to one aspect of the invention, a request is received by a client for access to a computer resource. A usage rate is determined for the client. The usage rate of clients are reduced by transmitting a request for a usage reduction to the clients. The request is initiated independent of a receipt from a message from the clients whose usage rate is being reduced.

According to another aspect of the invention, a request to reduce the usage rate by a minimum reduction amount is sent to one or more other clients. Non-real-time clients receive a request to reduce their usage rate. If a requested usage reduction would reduce a client below a minimum usage rate, then the usage rate of the client is set to the minimum usage rate. The minimum usage rate can be established by the client or by configuration data. The usage rate of a non-real-time client is adjusted based on a uniform rate. If the uniform rate is higher than a maximum usage rate, then the usage rate of a non-real-time client is adjusted to the maximum usage rate. The maximum rate can be established by the client or by configuration data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for sharing a resource among a plurality of clients is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
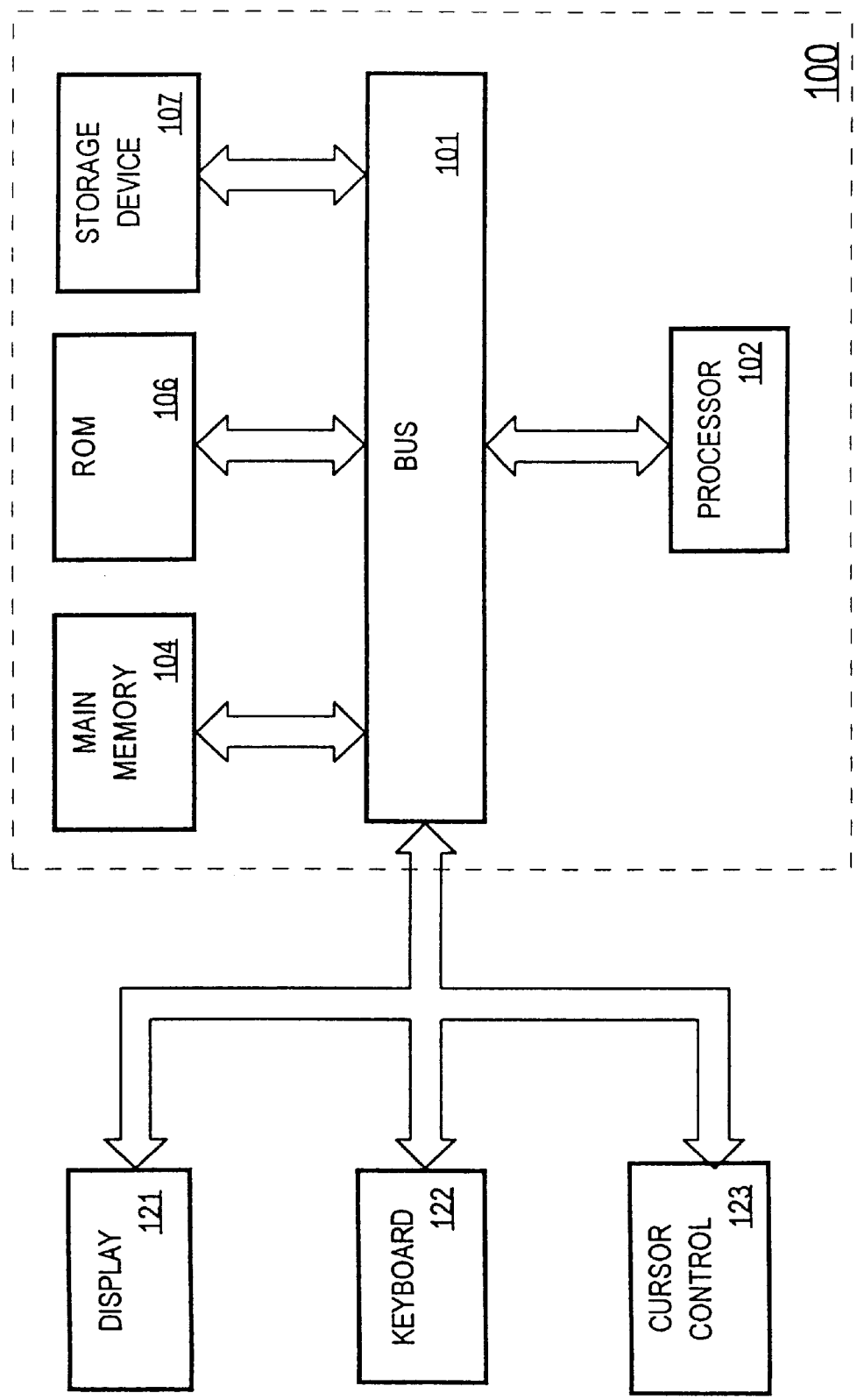
FIG. 1 is a block diagram of a computer system upon which an embodiment of the invention can be implemented.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to share a resource among a plurality of clients. According to one embodiment, sharing a resource among a plurality of clients is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

Functional Overview

A resource coordinator is a process, thread, or other executing entity that manages a computer resource. Before a client may access a computer resource, the client transmits a request for access to the resource to a resource coordinator.

In one embodiment of the invention, a resource coordinator manages access to a resource which is a disk system containing files. When the client transmitting the request for access to the resource is a real-time client, the request can include a "desired" usage rate and a requested file. In response to receiving the request from the real-time client requesting access to the resource, the resource coordinator determines whether the resource can be accessed at that desired usage rate with minimal risk of interfering with the usage of the resource by the clients already permitted access to the resource. The determinations can based on the difference between aggregate usage previously granted to each client and the bandwidth of the disk system.

The resource coordinator returns a message to the requesting client indicating whether access at the desired rate is permitted. If this message indicates that access can be granted, a file handle can also be transmitted to the real time client. The rate at which access to a resource is granted is the assigned usage rate.

When the client transmitting a request for access to a shared resource is a non-real-time client, the request includes a requested file. The request does not include a desired rate like the request from a real-time client. In response to the request from the non-real-time client for access to the resource, the resource coordinator determines the rate that can be assigned, if any, to the non-real-time client. After the resource coordinator determines the assigned usage rate, it transmits a message to the non-real-time client indicating the assigned usage rate and the file handle.

The real-time or non-real time client stores its assigned usage rate in a variable or other similar data structure. The real-time or non-real-time client is responsible for limiting its access to the resource at the assigned usage rate. The assigned usage rate of a non-real-time client may be changed by the resource coordinator in response to various events which shall be explained in further detail.

Callback Mechanism

To change the assigned usage rate of a non-real-time client, a callback mechanism is used. A callback mechanism can include for example, a remote object broker or a remote procedure call. A remote object broker enables one process, thread, or similar executing entity to invoke a method which is executed by another process, thread, or similar executing entity. An invocation of a method by a process, thread, or similar executing entity that is executed by another by process, thread, or similar executing entity is herein referred to as a remote invocation. The process, thread, or similar executing entity may be on the same or a different node than the process, thread, or similar executing entity executing the method. Similarly, a procedure call enables one process, thread, or similar executing entity to call a procedure which is executed by another process, thread, or similar executing entity. The process, thread, or similar executing entity invoking the procedure may be on the same or a different node than the process, thread, or similar executing entity executing the procedure. It should be apparent to one skilled in the art that there are other techniques that can be used to implement a callback mechanism.

Linking information is used to identifying the method to invoke and the executing process which executes the method. A process remotely invoking a method may transmit the parameters to the process executing the method. A remote invocation of a method is used to communicate a change in the assigned usage rate to a process, thread, or other executing entity that is a non-real-time client. In response to the remote invocation of the method, the non-real-time client can change a variable or other similar data structure used to represent the non-real-time client's assigned usage rate.

To enable the resource coordinator to use the call back mechanism to change the assigned usage rate of a non-real-time client, the non-real-time client transmits linking information to the resource coordinator. The linking information can be, for example, transmitted with the request by the non-real-time client for access to a resource. The linking information is used by the resource coordinator to invoke the callback mechanism in order to change the assigned usage rate of a non-real-time client.

Minimum and Maximum Usage Range

When a resource coordinator changes the assigned usage rate, the new assigned usage rate must conform to an allowable range defined by a pre-determined minimum usage rate and maximum usage rate. The minimum usage rate is the lowest access rate to a resource that a resource coordinator will assign to a non-real-time client. The minimum usage rate represents the lowest usage rate that permits a non-real-time client to perform its function at an acceptable pace. The maximum usage rate represents the highest usage rate that can be handled by a non-real-client. A default minimum usage range and maximum usage range is established based on configuration data stored in computer system 100.

A non-real-time client can override the default minimum and maximum usage rates. A non-real-time client can establish their own particular minimum usage rate and particular maximum usage rate by transmitting a message to the resource coordinator indicating the particular minimum usage rate and particular maximum usage rate to apply to the non-real-time client.

The minimum usage range and the maximum usage range used to define an allowable range for a particular client is herein referred to as the applicable minimum usage rate and the applicable maximum usage rate. For example, when a client has not transmitted their own particular minimum usage rate, the applicable minimum usage rate is the one established by the configuration file. When a client has transmitted their own particular minimum usage rate, that clients applicable minimum usage rate is the one the non-real-time client transmitted.

Minimum Reduction Size

When a resource coordinator reduces the usage rate assigned to a non-real-time client, subject to a few exceptions which shall be described, the resource coordinator will reduce the assigned usage rate by a minimum reduction size. The minimum reduction size can be expressed as percentage of the total usage capacity of a resource. The percentage can be established by configuration data stored in the computer system 100. For example, assume that a resource is a disk system whose bandwidth (i.e. usage capacity) is 1000 blocks. A configuration file can used to store a percentage of 1, which is used to determine the minimum reduction size. Accordingly, the minimum reduction size would is 10 blocks (i.e. 1% ×1000). It should be apparent to one skilled in the art that there are other techniques that can be used to establish the minimum reduction size.

Exemplary Resource Coordinator and Clients

Figure 2:
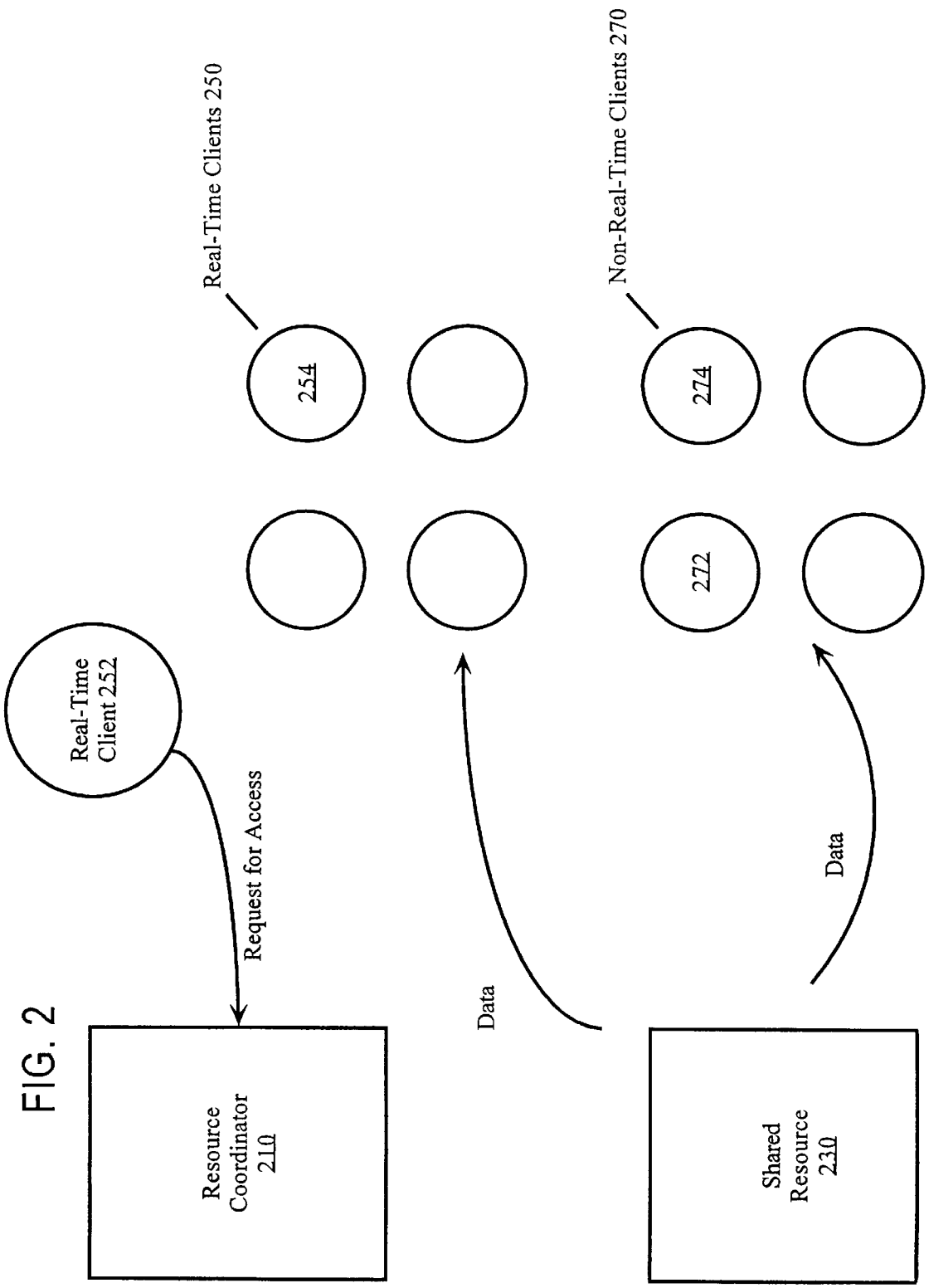
FIG. 2 is block diagram showing a resource coordinator, clients, and a shared resource used to illustrate steps of an embodiment of the invention.
Figure 3:
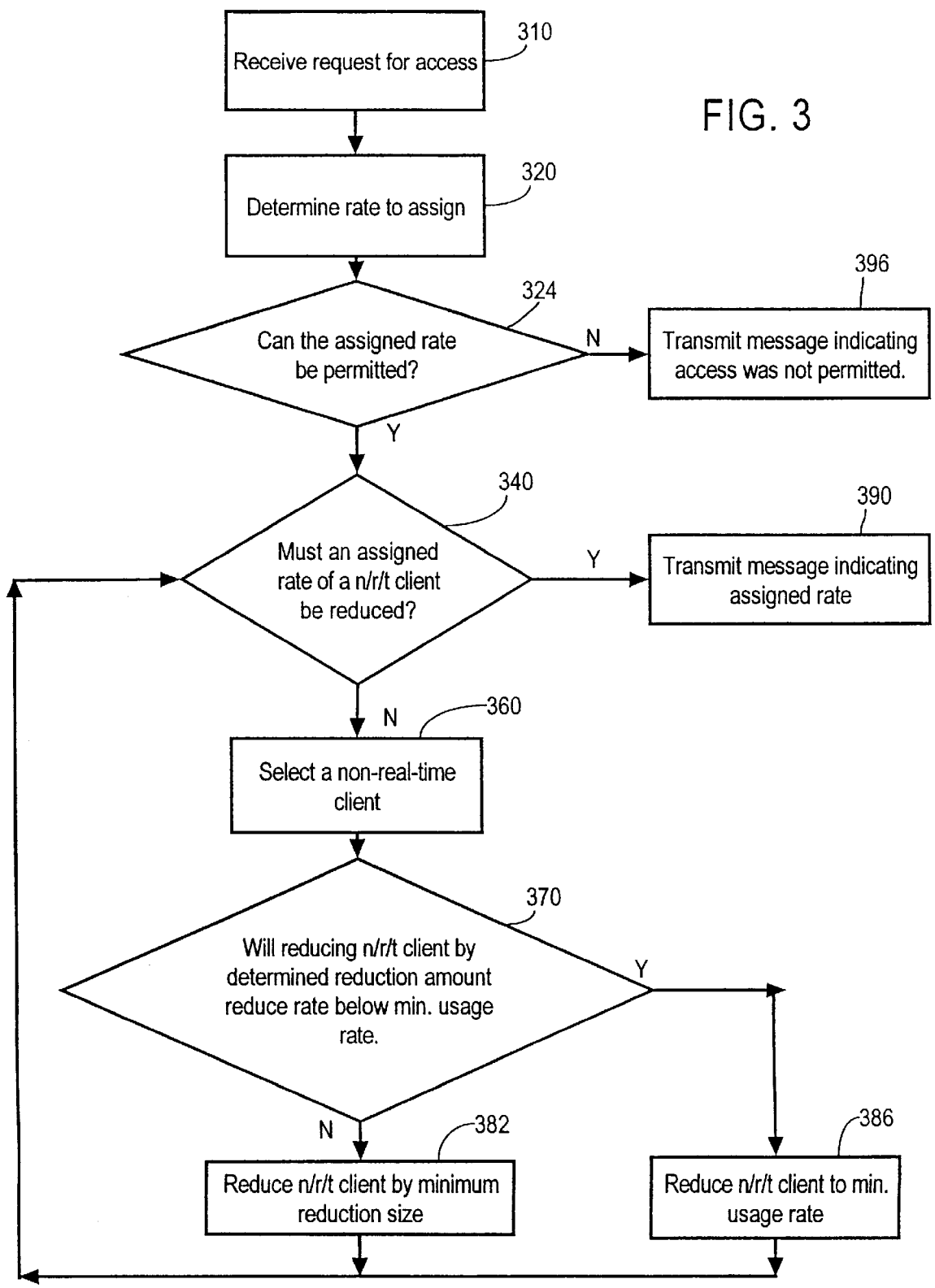
FIG. 3 is a flowchart depicting a method of sharing a resource among clients using a callback mechanism.

Referring now to FIG. 2 and FIG. 3, FIG. 3 illustrates a flow chart of a method to share the usage of a resource among a plurality of clients using a callback mechanism. FIG. 2 shows an exemplary resource coordinator, shared resource, and clients used to explain the method shown in FIG. 2. Resource coordinator 210 manages shared resource 230. For the purposes of illustration, shared resource 230 is disk system containing files. The bandwidth (i.e. usage capacity) of shared resource 230 is 40 blocks/sec.

Real time clients 250 and non-real-time clients 270 are together using shared resource 230 to its fullest usage capacity. Real-time clients 250 and non-real-time clients 270 have been each assigned a rate of 5 blocks/sec by resource coordinator 210, for a total of 40 blocks/sec.

The minimum reduction size is 3 blocks/sec. This minimum reduction size is based on a percentage (7.5%) represented by data in a configuration file and the bandwidth of shared resource 230 (40 blocks/sec). The configuration data in the configuration file is used to establish a maximum usage rate of 5 blocks/sec, and a minimum usage rate of 2 blocks/sec.

Assigning Usage Rates

The method to share usage of a resource among a plurality of clients using a callback mechanism shall now be described with reference to the steps in FIG. 3. In step 310, a resource coordinator receives a request from a requesting client for access to a shared resource managed by the resource coordinator. The request can include a file identifier. If the requesting client is a real-time client, the request includes a desired rate. If the requesting client is a non-real-time client, the request includes linking information used by a callback mechanism. In this example, resource coordinator 210 receives a request from real-time client 252 for access to shared resource 230 at a desired rate of 5 blocks/sec. Control passes to step 320.

In step 320, resource coordinator 210 determines a rate to assign to a requesting client. When the client requesting access to a shared resource is a real-time client, the rate to assign is the desired rate because a real-time client requires usage at the desired rate in order to function properly. When the client requesting access to a shared resource is a non-real-time client, then the assigned usage rate is determined in different manner. The assigned usage rate for a non-real-time client is determined by first calculating the amount of the usage capacity not currently assigned to real-time clients, and dividing that amount by the number of non-real-time clients that would exist after permitting access to the requesting non-real-time client. If this calculation results in a value greater than the applicable maximum usage rate, then the assigned usage rate for the non-real-time client is the applicable maximum usage rate. In this example, the assigned usage rate is 5 blocks/sec because the client requesting access is a real-time client desiring a rate of 5 blocks/sec.

There are numerous approaches to determining an assigned usage rate to assign to a non-real-time client. It will be apparent to those of ordinary skill in the art that other techniques for determining an assigned usage rate can be implemented.

Determining Whether Access Can Be Permitted

The next step is step 324. In step 324, a determination is made of whether access to the shared resource at the assigned usage rate determined in step 320 can be permitted. The determination begins by first determining the available unassigned usage. The available unassigned usage is the difference between the sum of the assigned usage rates assigned to each client and the usage capacity of the shared resource. If the available unassigned usage is greater than the assigned usage rate determined for the requesting client in step 320, then access to the shared resource can be permitted, and control passes to step 340.

If the available unassigned usage is not greater than the assigned usage rate determined for the requesting client in step 320, then a maximum amount available by reduction is determined. The maximum amount available by reduction is the amount that can be made available by reducing each assigned usage rate currently assigned to a non-real-time client to the applicable minimum usage rate. If the maximum available by reduction and the available unassigned usage are together greater than the assigned usage rate determined for the requesting client, then the assigned usage rate determined for the requesting client can be permitted and control passes to step 340. Otherwise, control passes to step 396.

In this example, there is no available unassigned usage because the full bandwidth has been assigned. The maximum amount available by reduction would be the difference between the sum of the assigned usage rates actually assigned to each current non-real-time client and the sum of the assigned used rates hypothetically assigned to each current non-real-time client if the assigned usage rates of the current non-real-time clients were reduced to the minimum usage rate. A current non-real-time client is a non-real-time client that has been previously permitted access and has not yet relinquished access. Here, where the minimum usage rate is 2 blocks/sec, the maximum amount available is calculated as (4 non-real-clients×5 blocks/sec) minus (4 non-real-time clients×2 blocks/sec), which is 12 blocks/sec. Because, 12 blocks/sec is greater than the assigned usage rate determined for the requesting client, access at the assigned usage rate can be permitted. Thus control would pass to step 340.

There are numerous approaches to determining whether access to a shared resource by a client can be permitted at a given rate. It will be apparent to those of ordinary skill in the art that other techniques can be implemented for determining whether access to a shared resource by a client can be permitted.

If access can not be permitted at the assigned usage rate determined for the requesting client, then control passes to step 396. In step 396, the resource coordinator transmits a message to the requesting client indicating that access to the shared resource is not permitted. In an alternate embodiment of the invention, when a resource coordinator transmits a message to the client indicating that access at the desired rate can not be granted, the resource coordinator also transmits a reduced rate at which access can be granted.

Reducing Usage By Non-Real-Time Clients

At step 340, a determination is made of whether the assigned usage rate of a non-real-time client must be reduced. The assigned usage rate of another non-real-time client must be reduced when an accumulated amount made available by reducing the assigned usage rates of the current non-real-time client is less than the assigned usage rate determined for the requesting client. An accumulated amount made available is sum of the reductions in the assigned usage rates of non-real-time clients made in course of executing the loop represented by steps 340 through 386 during the present invocation of the steps in FIG. 3. The loop defined by steps 340 through 386 iteratively reduces the assigned usage rate of the current non-real-time clients until the cumulative reduction is at least as great as the assigned usage rate determined for the requesting client. If the determination made is the assigned usage rate of a non-real-time client must be reduced, then control passes to step 360. In this example, because there is no accumulated amount made available at this point, control passes to step 360.

In step 360, a non-real-time client is selected for reduction. Any client not previously selected in step 360 in the present invocation of the steps of FIG. 3 can be selected. In this example, non-real-time client 272 is selected. Control then passes to step 370.

In step 370, a determination is made of whether reducing the assigned usage rate of the selected non-real-time client by a reduction amount reduces the assigned usage rate below the minimum usage rate. A reduction amount is the lesser of the difference between the assigned usage rate determined for the client and accumulated amount made available, or the minimum reduction size. If reducing the assigned usage rate of the selected non-real-time client by the reduction size reduces the assigned usage rate of the non-real-time client below the applicable minimum usage rate, then control passes to step 386. Otherwise control passes to step 382.

In this example, the assigned usage rate of the selected non-real-time client, non-real-time client 272, is 5 blocks/sec. Reducing this by 3 blocks/sec, the minimum reduction size, would reduce the assigned usage rate to 2 blocks/sec. Since 2 blocks/sec is not less than the minimum usage rate (2 blocks/sec), control passes to step 382.

At step 382, the assigned usage rate assigned to the non-real-time client is reduced by the minimum reduction size. The resource coordinator transmits a message indicating the reduced assigned usage rate to the selected non-real-time client using the callback mechanism. Control then passes to step 340. In this example, the assigned usage rate of non-real-time client 272 is reduced to 2 blocks/sec. Resource coordinator transmits a message indicating the reduced assigned usage rate to non-real-time client 272 using the linking information non-real-time client 272 previously provided and the callback mechanism previously described.

At step 386, the assigned usage rate is reduced to the minimum usage rate. The resource coordinator transmits a message indicating the reduced assigned usage rate to the selected non-real-time client using a callback mechanism. Control then passes to step 340.

In this example, after the performance of step 382 mentioned above, control passes step 340. At step 340, because the accumulated amount made available (3 blocks/sec) is less than the assigned usage rate determined for the requesting client (5 blocks/sec), the determination made is that the usage rate of another non-real-time client must be reduced. Therefore control passes to step 360.

At step 360, non-real-time client 274 is selected. At step 370, the difference between the assigned usage rate determined for the requesting client (5 blocks/sec) and accumulated amount made available (3 blocks/sec) is 2 blocks/sec. Because this difference is less than the minimum reduction size (3 blocks/sec), the reduction size is 2 blocks/sec. Because reducing the assigned usage rate of non-real-time client 272 (5 blocks/sec) by the reduction size (2 blocks/sec) will not reduce the assigned usage rate below the minimum usage rate (2 blocks/sec), control passes to step 382. At step 382, the assigned usage rate of non-real-time client 274 is reduced by the reduction size to 3 blocks/sec (i.e. 5 blocks/sec minus 2 blocks/sec). Control passes to step 340.

At step 340, because the accumulated amount made available (5 blocks/sec) is not less than the assigned usage rate determined for the requesting client (5 blocks/sec), the determination made is that the usage rate of another non-real-time client does not have to be reduced. Therefore, control passes to step 390. Note that messages were only transmitted to two of the four current non-real-time client in order to make usage available to the requesting client.

In step 390, a message is transmitted to the requesting client indicating that access at the assigned usage rate determined for the requesting client is permitted. The message also contains a file handle of the requested file.

In the example illustrated, the steps are executed in response to a request for access to a shared resource. It should be apparent to one skilled in the art that the steps can be in executed in response to other events or conditions requiring adjustment of assigned usage rates assigned to clients. For example, the steps could be executed in response to a client requesting an increase of its assigned usage rate.

Periodically Equalizing Assigned Usage Rates

At given time intervals, the resource coordinator will equalize the assigned usage rates assigned to the current non-real-time clients. In one embodiment of the invention, a uniform rate is determined for the current non-real-time clients. To determine a uniform rate, an amount available for equalization is calculated. The amount available for equalization is the usage capacity of the shared resource not assigned to any client and the sum of the assigned usage rates assigned to each non-real-time client. The amount available for equalization is then divided by the number of current non-real-time clients. In determining a uniform rate, the applicable minimum usage rate and the applicable maximum usage rate is taken into account.

Once the uniform rate is determined, the resource coordinator adjusts the assigned usage rate of each non-real-time client. A non-real-time client is never adjusted above the applicable maximum usage rate, or below the applicable minimum usage rate. Each assigned usage rate is adjusted by transmitting a message via the call back mechanism indicating the new assigned usage rate (the uniform rate) to each current non-real-time client.

In this example, assume that after real-time-client 252 was permitted to access shared resource 230, real-time client 254 relinquishes access to shared resource 230. Assume further that after real-time client 254 relinquishes access, resource coordinator 210 begins to equalize the assigned usage rates assigned to each non-real-time client.

First resource coordinator 210 determines the amount available for equalization. After real-time client 254 relinquished access, 5 blocks/sec of usage capacity was left unassigned. After the reductions of the assigned usage rates mentioned earlier, the sum of the assigned usage rates assigned to each current non-real-time client is 15 blocks/sec. Therefore, the equalization amount is 20 blocks/sec (i.e. 5 blocks/sec plus 15 blocks/sec). The uniform rate is determined by dividing the amount available for equalization (20 blocks/sec) by the number of non-real-time clients (4), which is 5 blocks/sec. Finally, resource coordinator 210 transmits a message indicating the new assigned usage rate (i.e. the uniform rate of 5 blocks/sec) to each current non-real-time client.

Being able to immediately reduce usage rate assigned to particular clients (e.g. non-real-time clients) permits a resource coordinator to immediately make access available to a requesting client. This capability offers several advantages. The resource coordinator can avoid under allocating the usage capacity to maintain a reserve in order to reduce the risk of denying access to a requesting client. Rather than under allocating the usage capacity, the resource coordinator can use a resource more efficiently by fully allocating its usage capacity without sacrificing the ability to respond to new requests.

Furthermore, the resource coordinator can make a resource available to requesting clients more quickly than under the polling approach previously mentioned. Upon receipt of request from a requesting client for access to a resource, the resource coordinator can immediately initiate action to make a portion of a resource's usage capacity available to satisfy the request from the requesting client. Under the polling approach, the resource coordinator had to wait to receive a message a non-real-time client before being able to initiate action to reduce the non-real-time client's assigned usage rate to make a portion of a resource's usage capacity available.

Not only was the resource coordinator delayed by having to wait for action initiated by a non-real-time client (i.e. the transmission of a message to the resource coordinator), but the resource coordinator was also dependent upon action initiated by the client. The callback mechanism, on the other hand, enables the resource coordinator to initiate a reduction of the assigned usage rate of a non-real-time client independent of the receipt of a message from a non-real-time client. Even more, the resource coordinator can independently respond to any condition or event the resource coordinator deems pertinent to managing a shared resource.

Each occurrence of a transmission of a message by a resource coordinator to reduce the assigned usage rate of a non-real-time client can be limited to the events that cause the need to reduce an assigned usage rate. Specifically, a message is only transmitted to a non-real-time client to reduce the assigned usage rate when the assigned usage rate needs to reduced to make usage available for the requesting client. Therefore, the considerable overhead incurred in transmitting a message is incurred only when necessary, and the computer resources expended as part of the overhead in transmitting messages are used more efficiently.

Another advantage of limiting the transmission of a message to reduce an assigned usage rate to the events that cause the need to reduce the assigned usage rate is that the cost of making an assigned usage rate of a non-real-time client available for reduction is less expensive than under the polling approach. As mentioned earlier, under the polling approach a non-real-time client whose assigned usage rate could be reduced was required to poll the resource coordinator. Since polling was so expensive, the set of non-real-time clients that polled the server was limited. Because the cost of making an assigned usage rate available for reduction is more affordable, the number of current non-real-time client whose assigned usage are available for reduction can be greater. Having a greater number of current non-real-time clients whose assigned usage is available for reduction makes a greater portion of the usage capacity of the shared resource available to satisfy the request of requesting client.

As noted in the exemplary illustration, requiring a minimum reduction size when reducing the assigned usage rate of a non-real-time client reduces the number non-real-time client that must be sent a message to reduce the assigned usage rate. As a result, less overhead is incurred. However, as demonstrated in the illustration, this reduction of overhead entails a tradeoff between reducing the number of messages transmitted and evenly distributing the reduction of assigned usage rates to all non-real-time clients.

Fortunately, the tradeoff can be effectively managed to obtain a desirable balance between reducing overhead and evenly distributing the reduction of assigned usage rates. First, the time interval between periodic equalization of the assigned usage rates can be adjusted. Second, the minimum reduction size can be increased or decreased. Decreasing the minimum reduction size decreases the amount by which each of the assigned usage rates of a non-real-time client is reduced, and increases the likelihood that the assigned usage rate of another non-real-time client will be reduced. Thus decreasing the minimum reduction size increases the number of non-real-time clients whose assigned usage rate is reduced, and more evenly distributes usage of the shared resource to the non-real-time clients.

Finally, as mentioned earlier, the number a non-real-time clients whose assigned usage rates is available for reduction can be greater. A greater number of current non-real-time clients whose assigned usage rates is available for reduction means that the usage of the shared resource is spread more evenly between non-real-time clients.

The techniques described above may be applied to any resource with a limited capacity that is shared concurrently by users of the resource. One of many examples is a network card in a distributed environment. The techniques described above can be used to manage the sharing of the network card among users that are both inputting and outputting to the card.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a computer system, a method of managing a shared resource among a plurality of clients, the method comprising the steps of:

receiving a request for access to the resource from a client;

determining an assigned usage rate for said client, said assigned usage rate being a rate at which said client is permitted to use said resource;

a message to said client to indicate that said client is permitted to use said resource at the assigned usage rate; and reducing the assigned usage rate for said client by transmitting a usage rate reduction to said client indicating a reduction in the assigned usage rate, wherein said steps of reducing the assigned usage rate and transmitting said usage rate reduction are initiated independently of receiving any message from said client.

2. The method of claim 1, further including the steps of:

determining whether reducing said assigned usage rate for said client by said usage rate reduction reduces said assigned usage rate for said client below a minimum usage rate; and in response to a determination that reducing said assigned usage rate for said client by said usage rate reduction reduces said assigned usage rate for said client below the minimum usage rate, then reducing said assigned usage rate for said client to a rate no lesser than the minimum usage rate.

3. The method of claim 1, wherein said usage rate reduction is at least as great as a minimum reduction size, said minimum reduction size being a minimum amount by which assigned usage rates of said plurality of clients may be reduced in response to a given request for usage reduction.

4. The method of claim 3, further including the step of establishing said minimum reduction size based on configuration data stored in said computer system.

5. In a computer system, a method of sharing a resource among a plurality of clients, the method comprising the steps of:

receiving a request for access to the resource from a requesting client;

determining a first rate for said requesting client, said first rate being a rate at which said client is permitted to use said resource;

reducing rates at which one or more other clients are permitted to access the resource by transmitting to each of said one or more other clients a request for a usage reduction indicating a reduction in the rate at which said other client is permitted to access said resource;

wherein said steps of reducing and transmitting to each of said one or more other clients are initiated independently of receiving any message from said one or more other clients; and transmitting a message to said requesting client to indicate that said requesting client is permitted to use said resource at said first rate.

6. The method of claim 5 wherein:

the plurality of clients includes a first set of real-time clients and a second set of non-real-time clients; and the method further comprises the step of selecting said one or more other clients from said second set of non-real-time clients.

7. The method of claim 6, further including the steps of:

determining a uniform usage rate for the second set of non-real-time clients; and for each non-real-time client:

if a rate at which said non-real-time client is permitted to access the resource is less than said uniform usage rate, then increasing the rate at which said non-real-time client is permitted to access the resource, and if a rate at which said non-real-time client is permitted to access the resource is greater than said uniform usage rate, then decreasing the rate at which said non-real-time client is permitted to access the resource.

8. The method of claim 7, wherein the step of increasing the rate at which said non-real-time client is permitted to access the resource further includes the steps of:

determining whether said uniform usage rate is greater than a maximum usage rate; and in response to a determination that said uniform usage rate is greater than said maximum usage rate, then increasing said rate at which said non-real-time client is permitted to access the resource to the maximum usage rate.

9. The method of claim 8, further including the step of establishing said maximum usage rate based on configuration data stored in said computer system.

10. The method of claim 8, wherein said maximum usage rate is established by said other client.

11. The method of claim 5, wherein the step of reducing rates at which one or more other clients is permitted to access the resource further includes the steps of:

determining whether reducing the rate at which the other client is permitted to access the resource by said usage reduction reduces the rate at which the other client is permitted to access the resource below a minimum usage rate; and if reducing the rate at which the other client is permitted to access the resource by said usage reduction reduces the rate at which the other client is permitted to access the resource below the minimum usage rate, then reducing the rate at which the client is permitted to access the resource to the minimum usage rate.

12. The method of claim 11, further including the step of establishing said minimum usage rate based on configuration data stored in said computer system.

13. The method of claim 11, wherein said minimum usage rate is established by said other client.

14. In a computer system, a method of sharing a resource among a plurality of clients, the method comprising the steps of:

determining a minimum reduction size, said minimum reduction size being a minimum amount by which usage rates of said plurality of clients may be reduced in response to a given request for usage reduction;

receiving a request for access to the resource from a requesting client;

determining a first rate for said requesting client, said first rate being a rate at which said client is permitted to use said resource;

reducing rates at which one or more other clients are permitted access to the resource by transmitting to each of said one or more other clients a request for a usage reduction indicating a reduction in the rate at which said client is permitted to access said resource, wherein said usage reduction requested in said request for usage reduction is at least as great as said minimum reduction size; and transmitting a message to said requesting client to indicate that said requesting client is permitted to use said resource at said first rate.

15. The method of claim 14 wherein:

the plurality of clients includes a first set of real-time clients and a second set of non-real-time clients; and the method further comprises the step of selecting said one or more other clients from said second set of non-real-time clients.

16. The method of claim 15, further including the steps of:

determining a uniform usage rate for the second set of non-real-time clients; and for each non-real-time client:

if a rate at which said non-real-time client is permitted to access the resource is less than said uniform usage rate, then increasing the rate at which said non-real-time client is permitted to access the resource, and if a rate at which said non-real-time client is permitted to access the resource is greater than said uniform usage rate, then decreasing the rate at which said non-real-time client is permitted to access the resource.

17. The method of claim 16, wherein the step of increasing the rate at which said non-real-time client is permitted to access the resource further includes the steps of:

determining whether said uniform usage rate is greater than a maximum usage rate; and in response to a determination that said uniform usage rate is greater than said maximum usage rate, then increasing said rate at which said non-real-time client is permitted to access the resource to the maximum usage rate.

18. The method of claim 17, further including the step of establishing said maximum usage rate based on configuration data stored in said computer system.

19. The method of claim 17, wherein said maximum usage rate is established by said other client.

20. The method of claim 14, wherein the step of reducing rates at which one or more other clients is permitted to access the resource includes the steps of:

determining whether reducing the rate at which the other client is permitted to access the resource by said usage reduction reduces the rate at which the other client is permitted to access the resource below a minimum usage rate; and if reducing the rate at which the other client is permitted to access the resource by said usage reduction reduces the rate at which the other client is permitted to access the resource below the minimum usage rate, then reducing the rate at which the client is permitted to access the resource to the minimum usage rate.

21. The method of claim 20, further including the step of establishing said minimum usage rate based on configuration data stored in said computer system.

22. The method of claim 20, wherein said minimum usage rate is established by said other client.

23. A computer readable medium having stored thereon a plurality of sequences of instructions, the plurality of sequences of instructions including sequences which, when executed by a processor, cause said processor to perform the steps of:

receiving a request for access to a resource from a client;

determining an assigned usage rate for said client, said assigned usage rate being a rate at which said client is permitted to use said resource;

transmitting a message to said client to indicate that said client is permitted to use said resource at the assigned usage rate; and reducing the assigned usage rate for said client by transmitting a usage rate reduction to said client indicating a reduction in the assigned usage rate, wherein said steps of reducing the assigned usage rate and transmitting said usage rate reduction are initiated independently of receiving any message from said client.

24. The computer readable medium of claim 23, further comprising sequences of instructions for performing the steps of:

determining whether reducing said assigned usage rate for said client by said usage rate reduction reduces said assigned usage rate for said client below a minimum usage rate; and in response to a determination that reducing said assigned usage rate for said client by said usage rate reduction reduces said assigned usage rate for said client below the minimum usage rate, then reducing said assigned usage rate for said client to a rate no lesser than the minimum usage rate.

25. The computer readable medium of claim 23, wherein said usage rate reduction is at least as great as a minimum reduction size, said minimum reduction.

26. The computer readable medium of claim 25, further including the step of establishing said minimum reduction size based on configuration data stored in a computer system.

27. A computer readable medium having stored thereon a plurality of sequences of instructions, the plurality of sequences of instructions including sequences which, when executed by a processor, cause said processor to perform the steps of:

receiving a request for access to a resource from a requesting client;

determining a first rate for said requesting client, said first rate being a rate at which said client is permitted to use said resource;

reducing rates at which one or more other clients are permitted to access the resource by transmitting to each of said one or more other clients a request for a usage reduction indicating a reduction in the rate at which said other client is permitted to access said resource;

wherein said steps of reducing and transmitting to each of said one or more other clients are initiated independently of receiving any message from said one or more other clients; and transmitting a message to said requesting client to indicate that said requesting client is permitted to use said resource at said first rate.

28. The computer readable medium of claim 27, wherein the plurality of clients includes a first set of real-time clients and a second set of non-real-time clients, the computer readable medium further comprising sequences of instructions for performing the step of selecting said one or more other clients from the second set of non-real-time clients.

29. The computer readable medium of claim 28, further comprising sequences of instructions for performing the steps of:

determining a uniform usage rate for the second set of non-real-time clients; and for each non-real-time client:
if a rate at which said non-real-time client is permitted to access the resource is less than said uniform usage rate, then increasing the rate at which said non-real-time client is permitted to access the resource, and
if a rate at which said non-real-time client is permitted to access the resource is greater than said uniform usage rate, then decreasing the rate at which said non-real-time client is permitted to access the resource.

30. The computer readable medium of claim 29, wherein the step of increasing the rate at which said non-real-time client is permitted to access the resource further includes the steps of:

determining whether said uniform usage rate is greater than a maximum usage rate; and in response to a determination that said uniform usage rate is greater than said maximum usage rate, then increasing said rate at which said non-real-time client is permitted to access the resource to the maximum usage rate.

31. The computer readable medium of claim 30, further comprising sequences of instructions for performing the step of establishing said maximum usage rate based on configuration data.

32. The computer readable medium of claim 30, wherein said maximum usage rate is established by said other client.

33. The computer readable medium of claim 27, wherein the step of reducing rates at which one or more other clients is permitted to access the resource further includes the steps of:

determining whether reducing the rate at which the other client is permitted to access the resource by said usage reduction reduces the rate at which the other client is permitted to access the resource below a minimum usage rate; and if reducing the rate at which the other client is permitted to access the resource by said usage reduction reduces the rate at which the other client is permitted to access the resource below the minimum usage rate, then reducing the rate at which the client is permitted to access the resource to the minimum usage rate.

34. The computer readable medium of claim 33, further comprising sequences of instructions for performing the step of establishing said minimum usage rate based on configuration data.

35. The computer readable medium of claim 33, wherein said minimum usage rate is established by said other client.

36. A computer readable medium having stored thereon a plurality of sequences of instructions, the plurality of sequences of instructions including sequences which, when executed by a processor, cause said processor to perform the steps of:

determining a minimum reduction size, said minimum reduction size being a minimum amount by which usage rates of a plurality of clients may be reduced in response to a given request for usage reduction;

receiving a request for access to the resource from a requesting client;

determining a first rate for said requesting client, said first rate being a rate at which said client is permitted to use said resource;

reducing rates at which one or more other clients are permitted access to the resource by transmitting to each of said one or more other clients a request for a usage reduction indicating a reduction in the rate at which said client is permitted to access said resource, wherein said usage reduction requested in said request for usage reduction is at least as great as said minimum reduction size; and transmitting a message to said requesting client to indicate that said requesting client is permitted to use said resource at said first rate.

37. The computer readable medium of claim 36, wherein the plurality of clients includes a first set of real-time clients and a second set of non-real-time clients, the computer readable medium further comprising sequences of instructions for performing the step of selecting said one or more other clients from a second set of non-real-time clients.

38. The computer readable medium of claim 37, further comprising sequences of instructions for performing the steps of:

determining a uniform usage rate for the second set of non-real-time clients; and for each non-real-time client:
if a rate at which said non-real-time client is permitted to access the resource is less than said uniform usage rate, then increasing the rate at which said non-real-time client is permitted to access the resource, and
if a rate at which said non-real-time client is permitted to access the resource is greater than said uniform usage rate, then decreasing the rate at which said non-real-time client is permitted to access the resource.

39. The computer readable medium of claim 38, wherein the step of increasing the rate at which said non-real-time client is permitted to access the resource further includes the steps of:

determining whether said uniform usage rate is greater than a maximum usage rate; and in response to a determination that said uniform usage rate is greater than said maximum usage rate, then increasing said rate at which said non-real-time client is permitted to access the resource to the maximum usage rate.

40. The computer readable medium of claim 39, further comprising sequences of instructions for performing the step of establishing said maximum usage rate based on configuration data.

41. The computer readable medium of claim 39, wherein said maximum usage rate is established by said other client.

42. The computer readable medium of claim 36, wherein the step of reducing rates at which one or more other clients is permitted to access the resource includes the steps of:

determining whether reducing the rate at which the other client is permitted to access the resource by said usage reduction reduces the rate at which the other client is permitted to access the resource below a minimum usage rate; and if reducing the rate at which the other client is permitted to access the resource by said usage reduction reduces the rate at which the other client is permitted to access the resource below the minimum usage rate, then reducing the rate at which the client is permitted to access the resource to the minimum usage rate.

43. The computer readable medium of claim 42, further comprising sequences of instructions for performing the step of establishing said minimum usage rate based on configuration data.

44. The computer readable medium of claim 42, wherein said minimum usage rate is established by said other client.

* * * * *